US007747792B2

(12) United States Patent
Chi et al.

(10) Patent No.: US 7,747,792 B2
(45) Date of Patent: Jun. 29, 2010

(54) RELATIVE TYPING WAITING TIME BEFORE DISAMBIGUATION AIDS

(75) Inventors: Liang-Yu Chi, San Francisco, CA (US); Julien F. Lecomte, Milpitas, CA (US)

(73) Assignee: Yahoo! Inc., Sunnyvale, CA (US)

(*) Notice: Subject to any disclaimer, the term of this patent is extended or adjusted under 35 U.S.C. 154(b) by 199 days.

(21) Appl. No.: 11/764,549

(22) Filed: Jun. 18, 2007

(65) Prior Publication Data
US 2008/0313359 A1    Dec. 18, 2008

(51) Int. Cl.
  *G06F 3/00* (2006.01)
(52) U.S. Cl. .............................. 710/18; 382/172; 704/4
(58) Field of Classification Search ................ 710/18; 382/172
See application file for complete search history.

(56) References Cited
U.S. PATENT DOCUMENTS

| 4,133,039 A * | 1/1979 | Eichenlaub | 376/215 |
| 5,754,176 A * | 5/1998 | Crawford | 715/711 |
| 6,563,514 B1 * | 5/2003 | Samar | 715/711 |
| 6,671,419 B1 * | 12/2003 | Martins | 382/274 |
| 2003/0234821 A1 * | 12/2003 | Pugliese | 345/816 |
| 2004/0153963 A1 * | 8/2004 | Simpson et al. | 715/500.1 |
| 2005/0289141 A1 * | 12/2005 | Baluja | 707/6 |
| 2006/0167995 A1 * | 7/2006 | Rui | 709/204 |

* cited by examiner

*Primary Examiner*—Henry W. H. Tsai
*Assistant Examiner*—Elias Mamo
(74) *Attorney, Agent, or Firm*—Hickman Palermo Truong & Becker LLP

(57) ABSTRACT

In accordance with an embodiment of the present invention, an assistance mechanism tracks a plurality of time intervals between a plurality of input events. Each input event of said plurality of input events is generated by a user physically manipulating an input device at a client. Based on the plurality of time intervals, the assistance mechanism dynamically determines a threshold period. Then the assistance mechanism determines whether a subsequent input event has been generated within said threshold period. In response to determining that an input event has not been generated within said threshold period, the assistance mechanism may cause information to be displayed at the client.

25 Claims, 7 Drawing Sheets

RELATIVE TYPING WAITING TIME BEFORE DISAMBIGUATION AIDS

FIELD OF THE INVENTION

The present invention relates to displaying help information to a client and in particular, to determining a time for displaying help information to a client.

BACKGROUND OF THE INVENTION

Search engines have a variety of assistance tools to help a user to find relevant information. Under a typical approach, a user types a query. After the query is submitted, a response page comes back. Sometimes, an assistance tool may detect a possible mistake in the query that was submitted, for example, a word is misspelled, or a less popular search term is entered rather than a more popular search term, etc. The response page, in that situation, may inform the user that a mistake may have been made and present suggestions to the user. The user may in turn look at the response and the information therein and choose to leave the input as is, change it by hand, or select one of the suggestions presented by the assistance tool as a next query. In short, under this approach, a user must first submit a query containing a mistake, and will then and only then obtain information to correct the mistake.

Under a different approach, the user may receive frequent suggestions at an annoying rate before a query is submitted. As the user types, an assistance tool provides suggestions regardless of whether the user needs them or not. For example, the user may click an input text box and initially type in a letter "a". The user then is shown a set of all possible search terms relating to "a" (in a drop down box of a user interface that is interacting with the user, for example). The user may type in a couple of more letters in the input text box. Another set of possible search terms relating to what have just been typed in is shown to the user.

Both of these existing approaches discussed above have problems. In the first instance, a user has to first submit a query that contains a mistake and then gets help information. The user is thus hindered from quickly obtaining relevant information because of the round-trip delay (this may happen, for example, if the search engine is busy or if the user waits a while to submit what has been typed). There is also a degree of distress and cognitive inefficiency as the user is forced to think about what to type in and knowingly submits a query that is less than ideal.

In the second instance, a user gets suggestions whether the user needs suggestions or not. But, oftentimes, suggestions may not be necessary because, for example, the user may know exactly what has to be typed in. Instead of being helped, the user may be distracted by constant appearances of unnecessary suggestions. Equally important, system resources including network bandwidth are needlessly wasted in this approach.

Thus, a need exists for improved ways of determining a time to display help information to a client.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
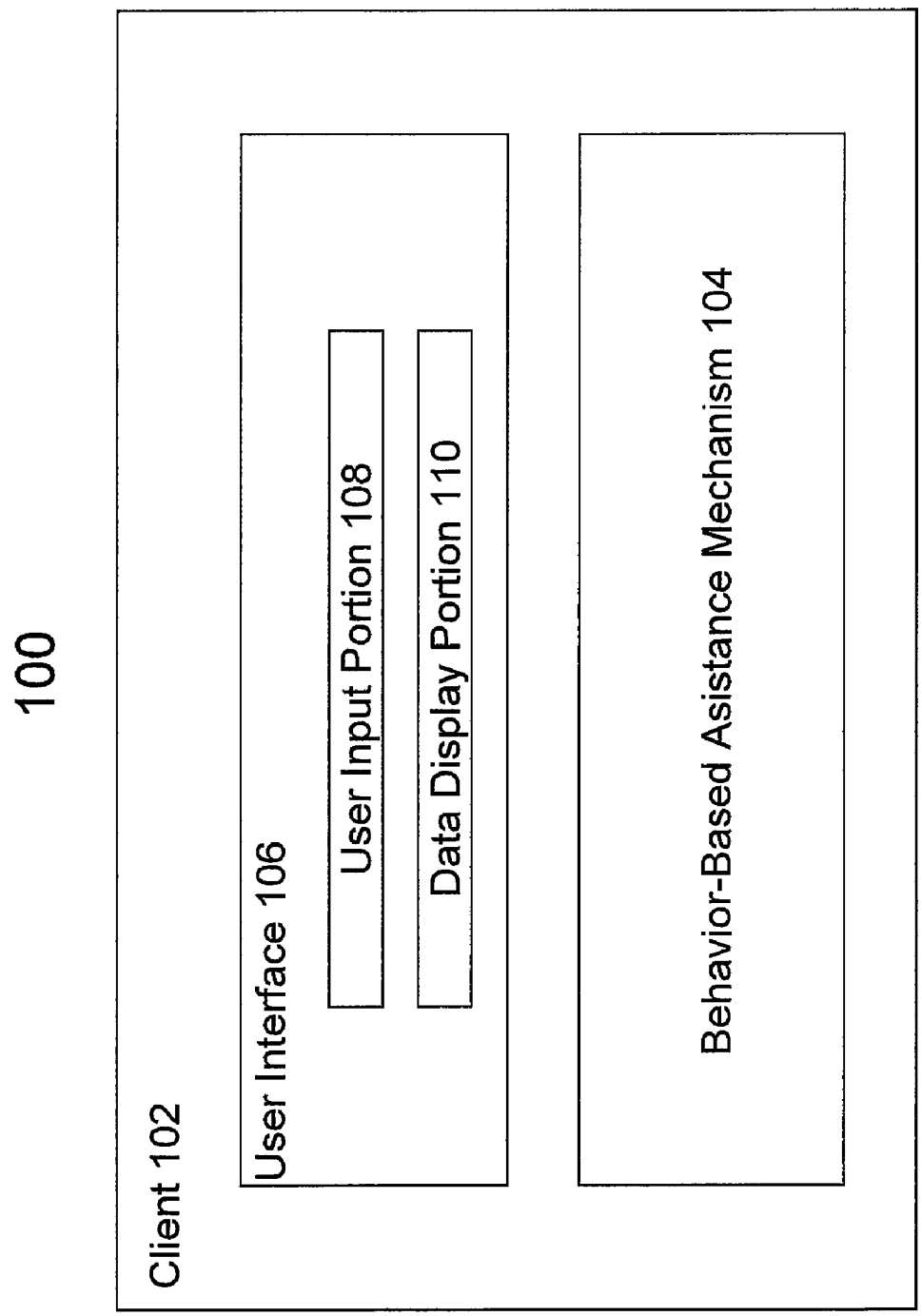
FIG. 1 illustrates a system, according to an embodiment of the present invention.

A method and apparatus for determining a time to display help information to client is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In accordance with an embodiment of the present invention, a behavior-based assistance mechanism is provided to determine when a user needs help information in a user session to locate information based on user input. In an embodiment, the assistance mechanism is implemented on a client where the user enters input. As used herein, the term "client" refers to an electronic device that a user may use to query for information. Types of electronic devices include, but are not limited to, a computer, a handheld device, a wireless device, a game device, etc.

In an embodiment, an assistance mechanism is provided at the client to track time intervals between two or more input events. Each time interval may be computed by taking the difference in time between two consecutive input events. As the user generates more and more input events, more and more time intervals may be generated. In an embodiment where an input event is a keystroke, a time interval measures time lapsed between two consecutive keystrokes entered by the user, the corresponding characters and/or symbols of which may be displayed in a portion (such as a text input box previously mentioned) of a user interface attached to the client.

In accordance with an embodiment of the present invention, a user is not provided with help information if a time interval generated by the two most recent input events falls within a normal range of time, referred to herein as a threshold period. Thus, if the most recent input event falls within the threshold period measured from the previously most recent input event, then the input event is considered being generated within a normal range of time. Accordingly, no help information is provided.

However, if the time interval generated by the two most recent input events falls outside the threshold period, then the user may be considered as needing help information for the purpose of completing a correct query. In that instance, the help information may be generated, in an embodiment, based on the present content of a user input (that comprises the two or more input events including the input event that falls outside the threshold period). Furthermore, the help information may be displayed in the user interface attached to the client.

In accordance with an embodiment of the present invention, the threshold period is not a static quantity or a fixed number, but rather a dynamic quantity that is determined based on the time intervals between recent the input events generated by the user.

In an embodiment, an overall distribution function is used to approximate a distribution of possible time intervals between any two theoretical successive input events generated by the user. Thus, in the case of keystrokes as input events, the overall distribution function approximates a distribution of possible time intervals between any two theoretical keystrokes made by the user. In an embodiment, this analytic function is a multiplicative combination of a Gaussian distribution, which describes a mean of the time intervals between consecutive input events with a finite variation (or standard deviation) of the same time intervals, and a Poisson distribution, which is related to a random arrival times of the input events such as the keystrokes.

Generally speaking, this overall distribution function may be characterized by one or more parameters. In an embodiment, one of the one or more parameters may be a mean of all possible time intervals between any two theoretical input events and a variance. In some embodiments, once the mean and the variance, which are dynamically determined based on the input events received, the threshold period may also be determined based on the mean and the variance. Other instantiations could use other averaging functions besides the arithmetic mean, for example, the geometric mean. Thus, the mean from which the input events deviate can be calculated as one of a plurality of mean values that include an arithmetic mean value, a geometric mean value, or any other values computed by methods known in the art.

Thus, under the present approach, the assistance mechanism not only measures different typing speeds corresponding to different users, but also measures different variations of a particular user's typing speed corresponding to different periods of the user session. Help information is provided at the client when a user has slowed down significantly relative to the user's typing speed (that is dynamically and continuously determined). Thus, the assistance mechanism here neither waits for the user to make a mistake in order to provide help, nor blindly provides help when the user does not need it.

The input events and suggestions as described herein may pertain to the World Wide Web. However, this invention is not so limited. More generally, the user input generated by the input events and results may pertain to any searchable data in any format. Furthermore, the data may be a user's address book, saved links, personally stored images (such as .jpeg files, .gif files, etc.), video, audio (.mp3 files, .wmv files, etc.), contact cards (e.g., v-cards), calendar objects, word processing documents, graphics files, or computer code (object files and source code).

Example System

According to an embodiment, as shown in FIG. 1, a system 100 comprises a client 102, a suggestion engine (not shown) and a search engine (not shown). The client 102 is a computing device that comprises an assistance mechanism 104 and a user interface 106. In another embodiment, the user interface 106 may be a display screen attached locally or communicatively linked to the computing device. For example, the user interface 106 may be provided by a monitor attached to the computing device locally. Alternatively, the user interface 106 may be provided by a monitor attached to a remote computer that communicatively linked to the computing device (for example via Virtual Private Network). The user interface includes a user input portion 108 and a data display portion 110. The user input portion 108 displays what has been inputted by a user through an input means. To provide user input (e.g., one or more characters) to the client 102, the user may use any input means such as a keyboard, keypad, a writing surface, a touch screen, etc.

Assistance Mechanism

In some embodiments, the assistance mechanism 104 at the client 102 may work in conjunction with a remote assistance system (e.g., a suggestion engine that maintains, ranks and provides suggestions) to provide help information to the user. In some embodiments, the assistance mechanism 104 may be implemented using one or more (dynamically downloadable) Javascripts. When the assistance mechanism 104 determines that the user needs help information, the mechanism 104 may send present content of the user input at the client to the remote assistance system. The remote assistance system may retrieve a list of suggestions for likely queries based on the present content of the user input and send back the suggestions to the client 102 for displaying to the user.

In order to define a point at which the user is deemed as needing help, the assistance mechanism 104 measures the user's typing speed and different variations thereof. When the user significantly slows down relative to the user's own typing speed, the user is determined as needing help. Thus, under this approach, the assistance mechanism 104, on one hand, does not wait for the user to submit a query with a mistake; and, on the other hand, does not provide help when the user does not need help.

In an embodiment, the assistance mechanism 104 uses a first distribution function to describe how intervals between consecutive keystrokes may distribute. The first distribution function represents a probability density of keystrokes as a function of time interval, which is defined as the time difference between two consecutive keystrokes made by the user, or more specifically, the difference between the time when any particular key is entered and the time when the next key following the particular key is entered. The shorter the time intervals, the faster the user's typing speed.

Example First Distribution Function

Figure 3:
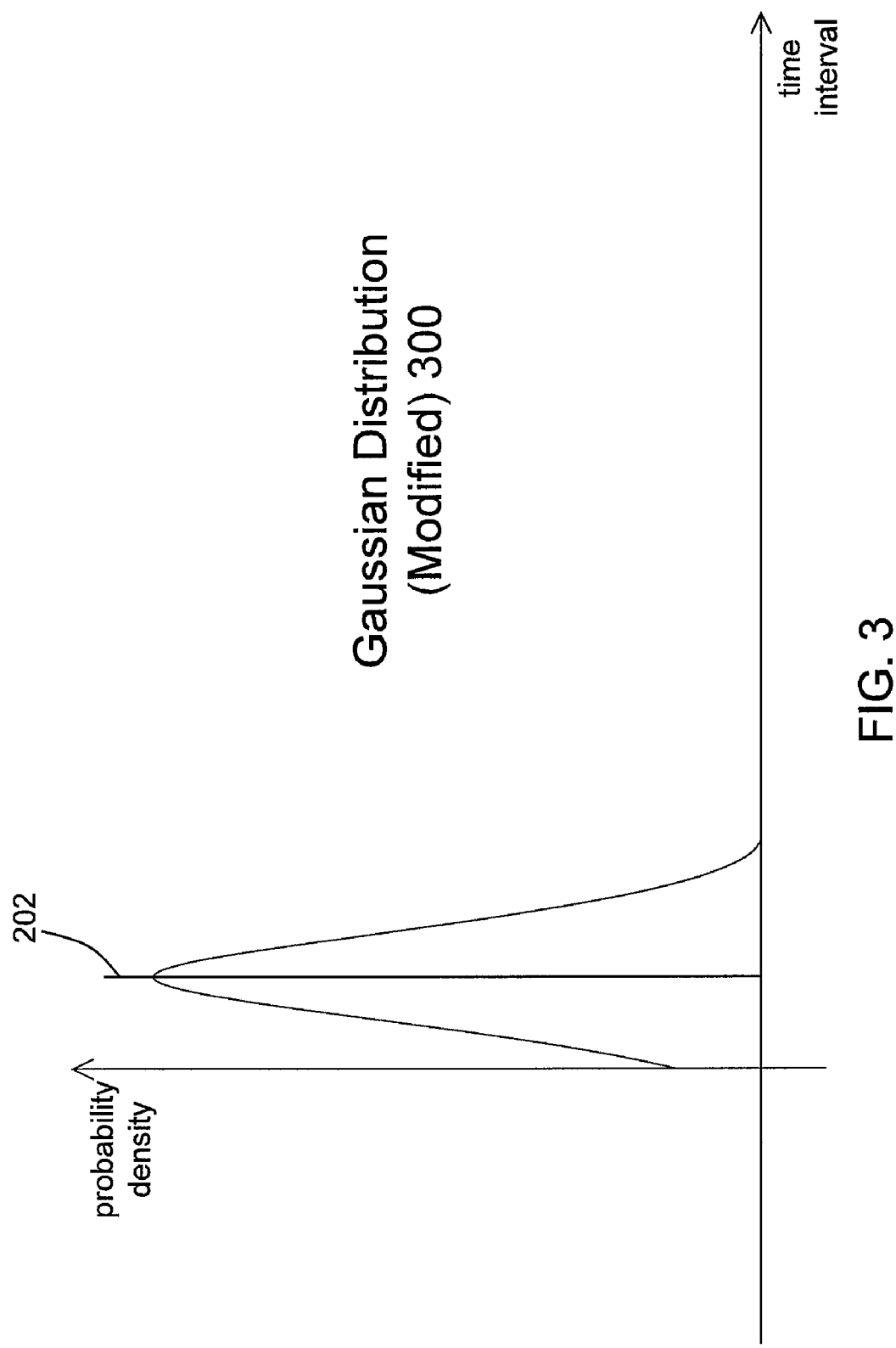
FIG. 3 illustrates a modified Gaussian distribution, according to an embodiment of the present invention.

As with many types of statistical modeling, the user's actual typing speed, in the form of a finite number of time intervals between consecutive keystrokes, can be approximated by a theoretical distribution that represents a probability distribution of an infinite number of independent time intervals along a time interval axis. In an embodiment, a modified Gaussian function, as shown in FIG. 3, may be used to define such a theoretical distribution.

Figure 2:
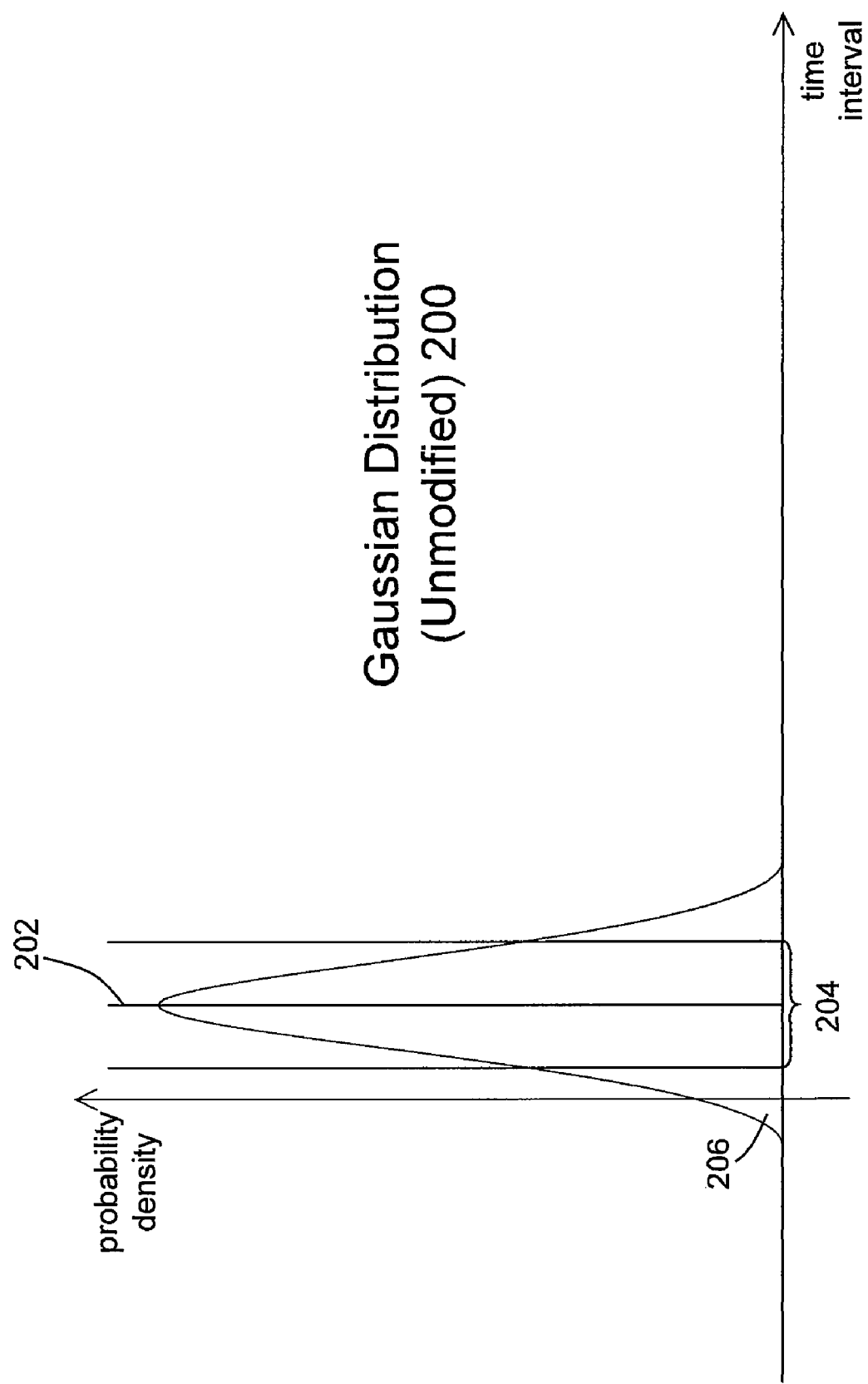
FIG. 2 illustrates a Gaussian distribution, according to an embodiment of the present invention.

In an embodiment, the modified Gaussian function (300 of FIG. 3) may be derived by 1) using a normal Gaussian (bell curve) distribution (e.g., 200 of FIG. 2) that has a center (202 of FIG. 2) to indicate highest probability density of keystroke at a particular time interval value, has a standard (finite) deviation range 204 of time interval values, and extends to infinities on both sides of the center; 2) setting values of the Gaussian function to zero for any negative time interval value (206 of FIG. 2); and 3) optionally, scaling (for example, linearly) the resultant (truncated) function at the end of the two previous steps so that the total probability of keystrokes derived by integrating probability density over all possible time intervals of the function is equal to 100 percent. Here, values of the Gaussian function are set to zero for any negative time interval value because the user cannot be expected to type faster than zero time interval with a typical input device.

Like the unmodified Gaussian distribution 200, the modified Gaussian distribution 300 may be determined (or characterized) by two parameters: one is the center 202 (i.e., a time interval value at which probability density of stroke is the highest; same as the center for the unmodified Gaussian distribution if the truncated Gaussian distribution at the end of step 2 above is linearly scaled) and a standard deviation range 204 in the unmodified Gaussian distribution.

Example Second Distribution Function

In an embodiment, in addition to the first distribution (which may be the modified Gaussian distribution as previously discussed), a second theoretical distribution of probability density of keystroke as a function of time interval is used to account for randomness of arrival time for a next key as measured from the time when the immediately preceding key is entered. This randomness of arrival time for the next key may be caused by many factors. For example, the next key may locate far away on the input device from its immediately preceding key. Particularly, if the next key to hit is the same key, the arrival time for the next key may be very little and the associated time interval is determined by the user's typing speed, i.e., how fast a user can normally hit the next key at certain probability. On the other hand, if the next key is on the other side of the input device, the arrival time for the next key will be determined not only by the user's normal typing speed but also by the time it takes for the user (or, for example, the user's finger) to travel to the next key. Thus, even assuming the user can theoretically type at a particular time interval (or at a particular typing speed) with certain probability, some randomness may still exist as to when the next key may arrive because of other known or unknown factors involved in the input method.

Figure 4:
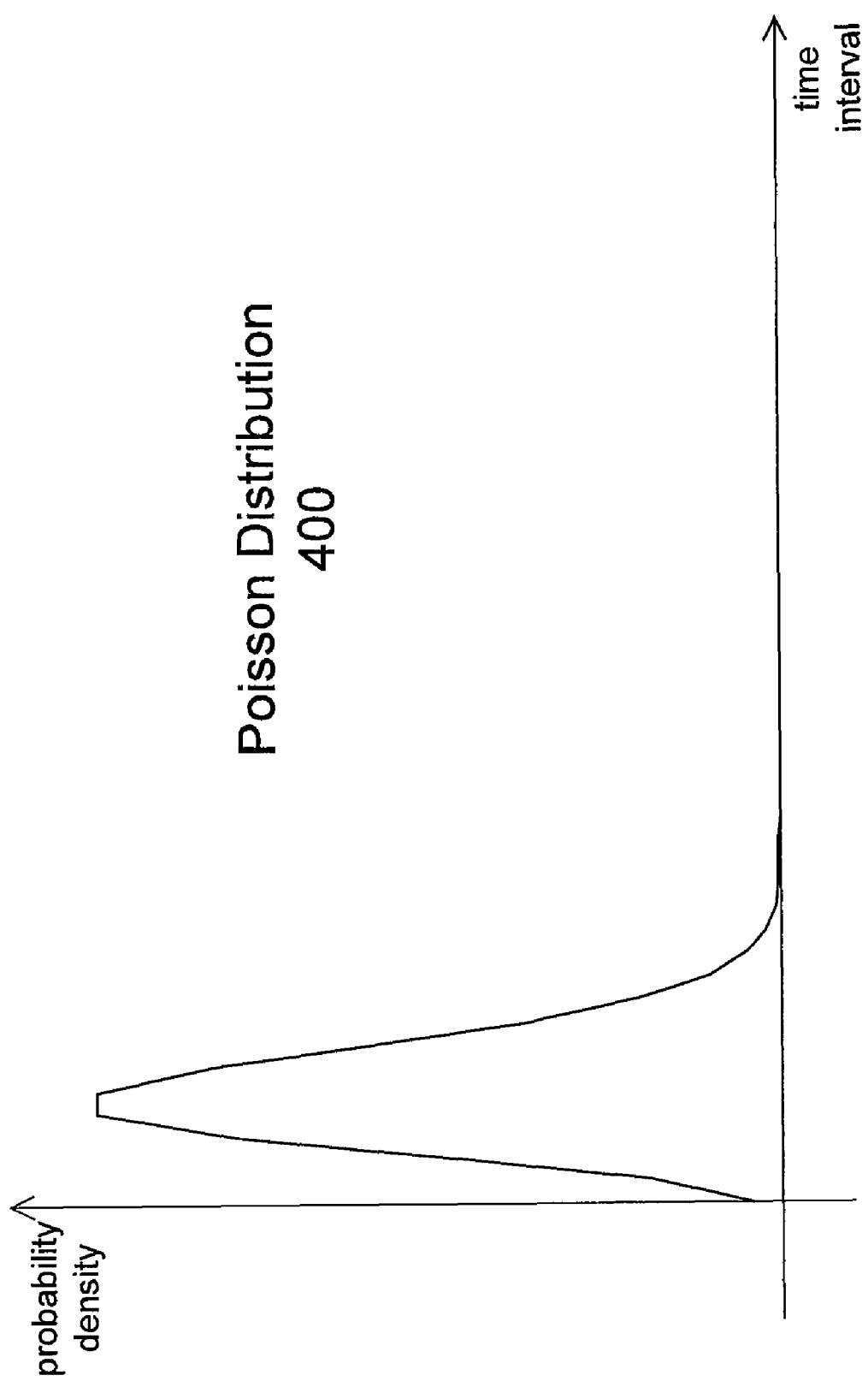
FIG. 4 illustrates a Poisson distribution, according to an embodiment of the present invention.

In an embodiment, to account for random arrival of any time interval caused by the known or unknown factors, a Poisson distribution (e.g., 400 of FIG. 4) may be used to represent the second theoretical distribution, previously mentioned. A Poisson distribution such as 400 of FIG. 4 may be characterized by a single parameter, known as lambda (or mean for the distribution). In an embodiment, this lambda parameter may be set to be associated with the center (time interval value) (e.g., 202 of FIGS. 2 and 3) of the first distribution. For example, the lambda parameter may be set to a value of a linear factor times the center time interval value 202 of the first distribution. In an embodiment, this linear factor is set to one. Thus, in this embodiment, the lambda parameter of the Poisson distribution and the center time interval value 202 of the Gaussian distribution are of the same value. In an alternative embodiment, the lambda parameter may be set to one tenth of the center time interval value 202 of the first distribution. In yet another embodiment, this linear factor is set to one-fifth of the same center time interval value 202. In a further embodiment, the lambda parameter of the Poisson distribution may be set to a constant that falls between 1 and 4. Thus, all variations of how the lambda parameter of the Poisson distribution may be associated with the center time interval value 202 of the Gaussian distribution are within the scope of the present invention.

In some embodiment, the lambda parameter is limited by a minimum. For example, a minimum value for the lambda parameter must at least be greater than a certain value reasonable for a particular type of the input device. In some embodiments, the minimum value to set for the lambda parameter may take into account the resolution or capacity of the input device in terms of how quickly the device can accept keystrokes. In an embodiment, the minimum value is 1 millisecond for a QWERTY type keyboard. In another embodiment the minimum is set to 10 milliseconds for a similar type keyboard.

Example Overall Distribution Function

Figure 5:
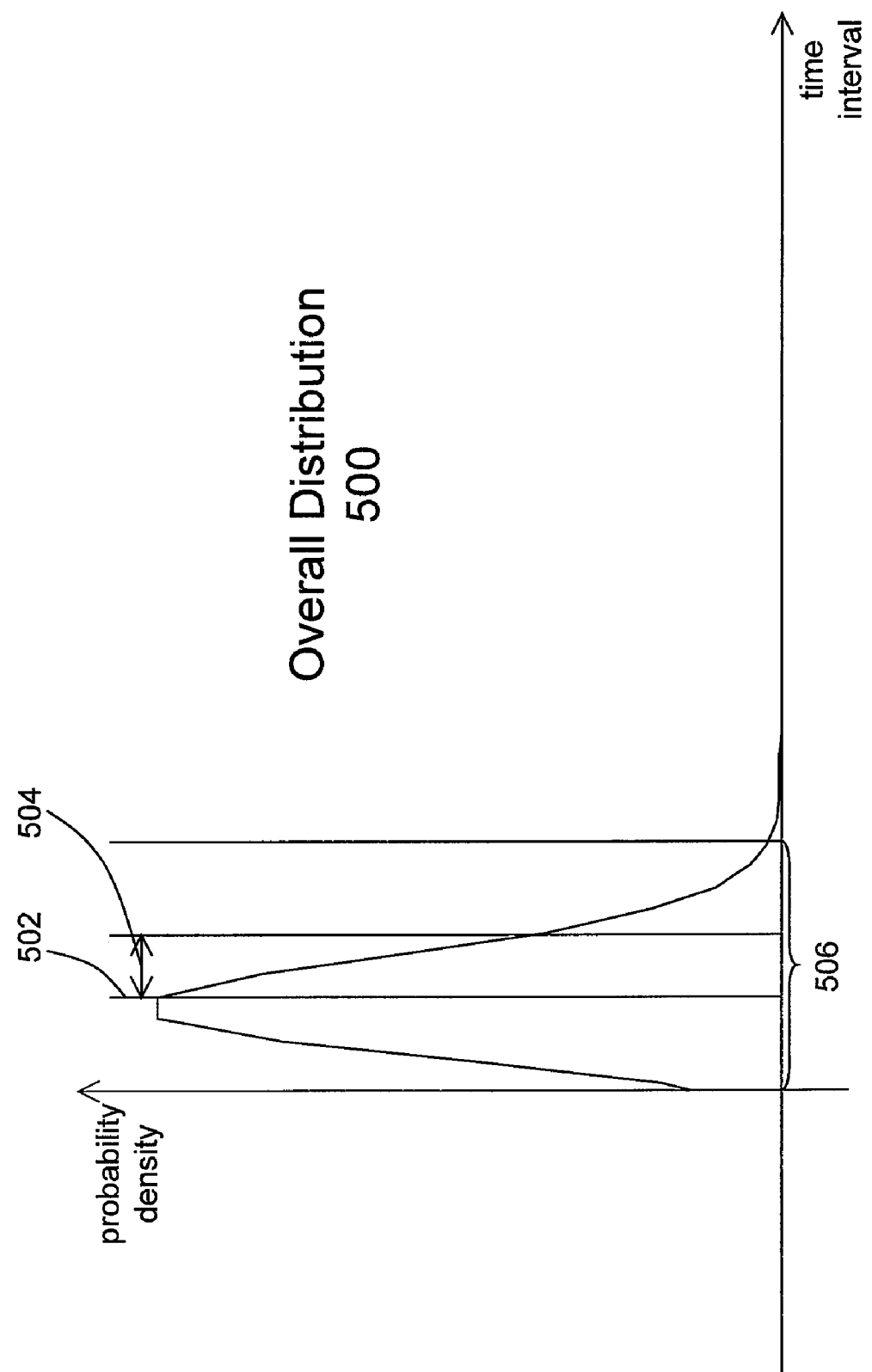
FIG. 5 illustrates an overall distribution, according to an embodiment of the present invention.

In an embodiment, the first distribution (e.g., the Gaussian distribution 200 of FIG. 3) and the second distribution (e.g., the Poisson distribution 400 of FIG. 4) are combined to provide an overall theoretical distribution (e.g., overall distribution 500 of FIG. 5) of probability density of keystroke as a function of time interval. There are various ways of combining the two distributions (e.g., 300 of FIGS. 3 and 400 of FIG. 4) into the overall distribution (500 of FIG. 5). In some embodiments, each of the first and second distributions may be given a weight factor. The overall distribution (e.g., 500 of FIG. 5) henceforth may be obtained by 1) using a multiplicative combination of the two distributions (e.g., 300 of FIGS. 3 and 400 of FIG. 4) as weighted (i.e., weighted Gaussian function times weighted Poisson function), and 2) scaling linearly the resultant curve so that the total probability as integrating probability density over all time interval values (i.e., along the time interval axis) is 100 percent. In an alternative embodiment, no weights are assigned and a straight multiplicative combination of the two may be used in step 1) above. In the alternative embodiment, step 2) may be similar.

In some embodiments, the overall (theoretical) distribution 500 of probability density of keystroke as a function of time interval can be characterized (or determined) by parameters that can be readily computed from statistical samples of keystroke events. For example, the overall (theoretical) distribution that is derived by using the modified Gaussian distribution and the Poisson distribution may be characterized by the center time interval value 202 and the standard deviation range 204 of the original Gaussian distribution, where the lambda parameter for the Poisson distribution may be determined by a relationship to the center time interval value 202.

In some embodiments, once the overall (theoretical) distribution 500 is obtained, a theoretical mean (502 of FIG. 5) and a theoretical variance (504 of FIG. 5) from the mean (502) can be computed. The theoretical variance 504, in an embodiment, is simply defined as the square root of mean squared deviation from the mean 502. In the embodiments where the modified Gaussian distribution 300 and the Poisson distribution 400 are used to derive the overall distribution 500, the mean 502 and the variance 504 can be determined once the center time interval 202 and the standard deviation range 204 are known.

In some embodiments, the overall distribution 500 (such as one derived by combining the Gaussian and Poisson distributions as described above) is characterized by two independent parameters. Particularly, the overall distribution 500 can be more conveniently characterized (or determined) by the mean 502 and the variance 504, instead of the center time interval value 202 and the standard deviation 204, because the assistance mechanism 104 can observe arrival times of actual keystrokes made by the user, compute time intervals from the actual keystrokes, and, based on the time intervals computed, directly determine (or estimate) the mean 502 and the variance 504 of the theoretical approximation as given by the overall distribution 500 of FIG. 5.

Threshold Period

In an embodiment, once the mean 502 and the variance 504 are known, a threshold period (506 of FIG. 5) can be determined based on the mean 502 and the variance 504. As used herein, the threshold period 506 defines a time period, starting from the occurrence of a particular stroke, during which time period a next keystroke immediately following the particular stroke should reasonably occur. On the other hand, if such a next keystroke does not occur during the threshold period 506, then the assistance mechanism 104 determines that the user needs to be provided with help information.

In an embodiment, the threshold period 506 can be set to the mean 502 plus a certain number times the variance 504, i.e., Threshold Period=Mean+$N$*Variance Where the number, N, may or may not be a fixed number (or a whole number). In some embodiments, N is fixed. In an embodiment, for example, N is three. In another embodiment, N may be four. In some other embodiments, N is linked to the mean. For example, N may be adjusted to a small value if the mean 502 varies to a large value (for example, for a slow-typist type of user); and adjusted to a large value if the mean 502 varies a small value (for example, for a fast-typist type of user). In an embodiment, N is set to be inversely proportional to the mean 502. Thus, in these embodiments where N is tied to the mean, the faster the user can type, the larger N may be used. In practice, a fast typist should get a shorter time delay than a slow typist. This is the common case. The inverse case described is possible, but would probably only be used for an input device where there are very extreme differences in entry ability in the general population (e.g. cell phone text messaging) The reason for varying N based on the mean typing speed of the user is to reduce the number of false positives. As used herein, a false positive is a false determination by the assistance mechanism 104 that a typist such as the user here needs help information. This may occur when a fast typist merely pauses for a slightly extra time, with no intention of accepting any help information.

Example Operation

Figure 6:
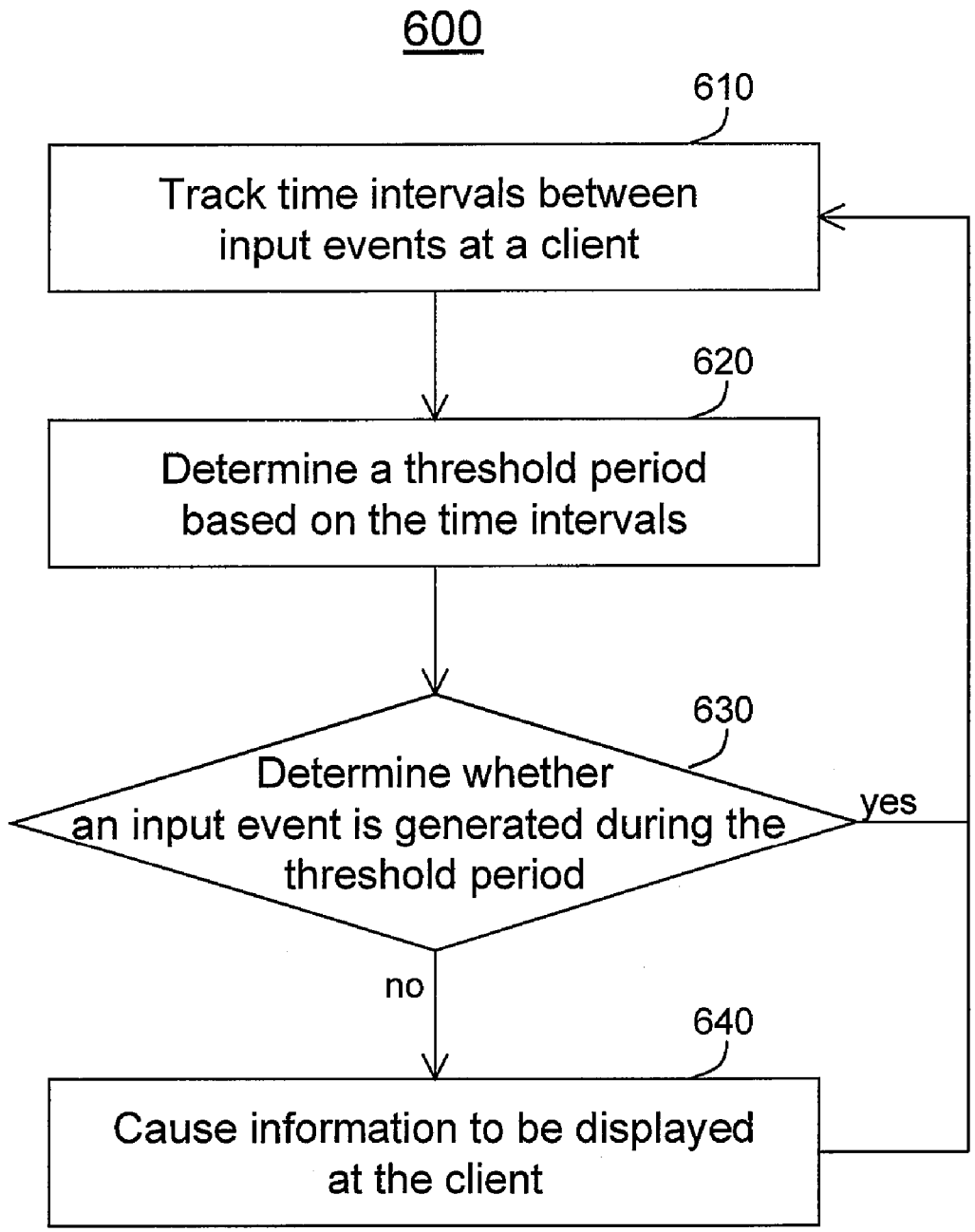
FIG. 6 is a flow diagram that illustrates a technique for supporting interaction between a client of a search engine and the search engine, according to an embodiment of the present invention.

FIG. 6 is a flow diagram that illustrates a process 700 for supporting determining an (optimal) time to display help information to a user, according to an embodiment of the present invention. In some embodiments, the process 700 is performed by the client 102, for example, the assistance mechanism 104 at the client 102.

In some embodiments, the assistance mechanism (104 of FIG. 1) receives a plurality of input events in a user session for the purpose of locating information from one or more data sources. As used herein, the input events may comprise keystrokes with a keyboard, data input through a keypad, moves made with a game device, writing on a pen-based system, contacts on a touch-sensitive screen, etc. that the user makes during the user session. Accordingly, the term "input device" may refer to a keyboard, a touchpad, a touch screen, a pen-based input area, a microphone, etc; and the term "input event" may refer to a keystroke or an input that is consistent with an input device at a client 102 and that is generated by a user manipulating the input device.

In these embodiments, the input events received generate a user input in the form of one or more characters, which may be a partially formed searchable text. In one embodiment, the user input is displayed in the user input portion (108 of FIG. 1).

In some embodiments, each input event carries timing information such as when the input event is generated. When the user manipulates an input device associated with the client 102 (e.g., clicks a key on a keyboard), the client 102 may generate an input event and stores a current timestamp therein.

Through the timing information in the input events received, the assistance mechanism 104 may compute a time interval between any two consecutive input events. For example, suppose that the assistance mechanism 102 receives Input Events 1 through 6; the assistance mechanism 104 may compute a time interval between Input Event 1 and Input Event 2, between Input Event 2 and Event 3, and so on. In this manner, a plurality of time intervals may be computed (or tracked) by the assistance mechanism 104 between the plurality of input events (step 610 of FIG. 6).

Based on the time intervals tracked, the assistance mechanism 104 determines a threshold period (step 620 of FIG. 6). For example, the assistance mechanism 104 may compute a running average (i.e., the previously described mean 502 of the overall distribution) and a variance (i.e., the previously described variance 504 of the overall distribution) of the time intervals.

In a particular embodiment, the statistical information of input events generated in a prior session by the same user is also taken into account in the calculation of the mean 502 and the variance 504 in a present session. For example, the number of input events, the mean and the variance of the prior session may be stored in a cookie; and the stored information in the cookie may be retrieved by the present session and used in the calculation of the mean 502 and the variance 504.

At step 630 of FIG. 6, the assistance mechanism 104 determines whether a new input event has been generated during the threshold period starting from the time when the last event (i.e., the most recent event in the plurality of input events) was received.

Upon determining that a new input event is not received during the threshold period, the assistance mechanism 104 determines that the user is in need of being provided with help information. For example, the user may halt generating a new input event in the threshold period because the user only remember a few characters in a search term or the user may only guess what a search term should be. As a result, the assistance mechanism 104 may send current content of the user input as generated by the existing plurality of input events to a suggestion engine or otherwise an assistance system. The suggestion engine or the assistance system may identify a list of suggestions relating to the current content of the user input and send the list for displaying at the client 102. In one embodiment, the partially formed searchable text should be at least N characters long, where N may be, for example, three, before the assistance mechanism sends any request for search results to the search engine.

Additionally or alternatively, the user input may be used by the assistance mechanism to retrieve suggestions from the local suggestion cache.

In this manner, the assistance mechanism 104 causes help information to be displayed at the client 102 (step 640 of FIG. 6). In some embodiments, the help information is displayed on the data display portion of the user interface 108 at the client 102.

On the other hand, upon determining that a new input event is received within the threshold period, the assistance mechanism 104 determines that the user is not in need of any help information.

Whether a new event is received within the threshold period, or without, the assistance mechanism 104 includes the new input event and the plurality of events in a new plurality of events, determines a time interval between the (last) most recently input event and the new input event, includes the time interval and the plurality of time intervals in a new plurality of time intervals, and re-computes new values of the mean 502 and the variance 504 based on the new plurality of time intervals. Once the new values of the mean 502 and the variance 504 are obtained, a new threshold period, which starts from the receipt of the new event, may be determined. The assistance mechanism 104 determines whether a second new input event is received after the new input event during the new threshold period. If it is determined that the second new input event is not received during the threshold period, help information relating to a new user input corresponding to the new plurality of input events may be caused to be provided at the client 102. This process continues until the user session is finished.

In some embodiments, information about the time intervals tracked in the user session is saved, for example, in a cookie that is associated with the user (or an identifier or name associated with the user).

Accommodate Slow Users

In some embodiments, where there is no prior history of input events for the user (e.g., the prior session's input events or statistical information is not saved, or the user is new to the client 102, etc.), for the first few input events received, the assistance mechanism 104 may record their timestamps and time interval information. However, the threshold period for the initial few, say 5, input events may set to an artificially high value, say 3 seconds. As the user's manipulation of the input device generates more and more input events, the assistance mechanism 104 learns to determine a typical running average for the user's speed of generating input events. In some embodiments, once more than a set number of, say 5, input events are received, the threshold period determination is no longer artificially set to a high value, but rather directly determined from the mean 502 and the variance 504.

For the purpose of illustration, two analytical distributions have been used to derive the overall distribution. However, this invention is not limited to using two analytical distributions to derive the overall distribution. In some embodiments, more or fewer distribution(s) may be used to derive the overall distribution. Furthermore, neither the distributions that are used to derive the overall distribution, nor the overall distribution, must be analytical functions. In fact, the overall distribution may be directly derived empirically using data collected on user input behaviors from a sufficiently large number of users. These and other variations of deriving an overall distribution are within the scope of the present invention.

Hardware Overview

Figure 7:
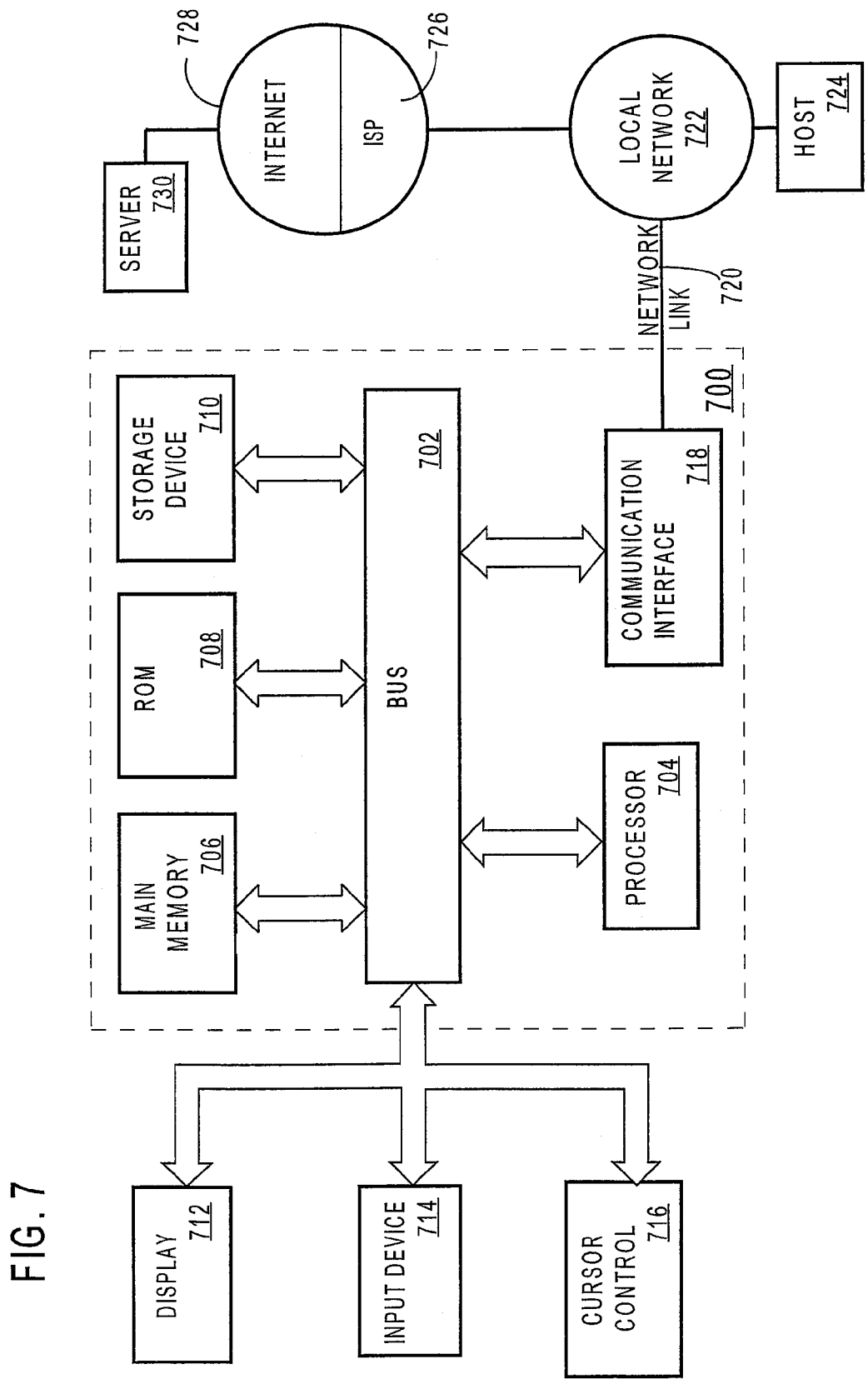
FIG. 7 is a block diagram that illustrates a computer system upon which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may be used to implement the techniques described herein. According to an embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    tracking a plurality of time intervals between a plurality of input events, each input event of said plurality of input events being generated by a user physically manipulating an input device at a client;
    dynamically determining a threshold period based on the plurality of time intervals;
    determining whether said threshold period has elapsed since a most recently detected input event; and
    if and only if said threshold period has elapsed since the most recently detected input event, performing the steps of:
        initiating a search for suggestions based on content of the plurality of input events;
        based on results of the search, identifying a plurality of suggestions that are likely queries each of which is selectable by the user;
        causing said plurality of suggestions to be displayed at the client;
    wherein the method is implemented by one or more computing devices.

2. The method of claim 1, further comprising, in response to determining that an input event has been generated within said threshold period, causing the information not to be displayed at the client.

3. The method of claim 1, wherein the threshold is linearly proportional to a running average of the plurality of time intervals.

4. The method of claim 1, wherein the plurality of suggestions relate to the plurality of input events.

5. A method comprising:
    tracking a plurality of time intervals between a plurality of keystrokes, each keystroke of said plurality of keystrokes being inputted by a user at a client;
    determining a threshold period based on the plurality of time intervals;
    wherein said determining a threshold period based on the plurality of time intervals comprises certain steps including:
        applying a modified Gaussian distribution to approximate a distribution of time intervals, wherein the distribution of time intervals includes said plurality of time intervals, and wherein the modified Gaussian distribution is derived from an unmodified Gaussian distribution and sets values of any negative time interval value to zero in the unmodified Gaussian distribution; and
        determining said threshold period based on said modified Gaussian distribution;
    determining whether said threshold period has elapsed since a most recently detected keystroke; and
    in response to determining that said threshold period has elapsed since the most recently detected keystroke, causing information to be displayed at the client;
    wherein the method is implemented by one or more computing devices.

6. The method of claim 5, further comprising, in response to determining that a keystroke has been inputted within said threshold period, causing the information not to be displayed at the client.

7. The method of claim 5, wherein the threshold is determined based on the plurality of time intervals using an analytic function that is a multiplicative combination of said modified Gaussian distribution and a Poisson distribution.

8. The method of claim 5, wherein the information displayed to the client is one or more suggestions relating to the plurality of keystrokes.

9. A system comprising:
a client;
a server connected to the client via a network connection;
said client configured to:
track a plurality of time intervals between a plurality of input events, each input event of said plurality of input events being generated by a physical manipulation by a user of an input device at the client;
dynamically determining a threshold period based on the plurality of time intervals;
determining whether said threshold period has elapsed since a most recently detected input event; and
if and only if said threshold period has elapsed since the most recently detected input event, performing the steps of:
initiating a search for suggestions based on content of the plurality of input events;
based on results of the search, identifying a plurality of suggestions that are likely queries each of which is selectable by the user;
causing said plurality of suggestions to be displayed at the client;
and
said server configured to, in response to a request from the client, download to the client executable code, wherein the executable code, when executed at the client, stores at the client statistical information about input events made by a user at the client.

10. The system of claim 9, wherein the client is configured to, in response to determining that an input event has been generated within said threshold period, cause the information not to be displayed at the client.

11. The system of claim 9, wherein the plurality of suggestions relate to the plurality of input events.

12. The method of claim 1, wherein said determining a threshold period based on the plurality of time intervals comprises using one or more analytical distributions to approximate a distribution of time intervals, wherein the distribution of time intervals includes said plurality of time intervals.

13. The method of claim 1, wherein said determining a threshold period based on the plurality of time intervals comprises using an empirical distribution to approximate a distribution of time intervals, wherein the distribution of time intervals includes said plurality of time intervals, and wherein the empirical distribution is created based on typing speeds of a plurality of users.

14. The method of claim 1, wherein said determining a threshold period based on the plurality of time intervals comprises determining a mean and a variance based on the plurality of time intervals.

15. The method of claim 1, wherein said threshold period is a sum of said mean and a multiple of said variance.

16. The method of claim 5, wherein said determining a threshold period based on the plurality of time intervals comprises determining a mean and a variance based on the plurality of time intervals.

17. The method of claim 16, wherein said threshold period is a sum of said mean and a multiple of said variance.

18. The system of claim 9, wherein the client is configured to use one or more analytical distributions to approximate a distribution of time intervals, wherein the distribution of time intervals includes said plurality of time intervals.

19. The system of claim 9, wherein the client is configured to use an empirical distribution to approximate a distribution of time intervals, wherein the distribution of time intervals includes said plurality of time intervals, and wherein the empirical distribution is created based on typing speeds of a plurality of users.

20. The system of claim 9, wherein the client is configured to determine a mean and a variance based on the plurality of time intervals.

21. The system of claim 20, wherein said threshold period is a sum of said mean and a multiple of said variance.

22. A computer-readable tangible storage medium storing one or more sequences of instructions, which instructions, when executed by one or more processors, cause the one or more processors to carry out the steps of:
tracking a plurality of time intervals between a plurality of input events, each input event of said plurality of input events being generated by a user physically manipulating an input device at a client;
dynamically determining a threshold period based on the plurality of time intervals; determining whether said threshold period has elapsed since a most recently detected input event; and
if and only if said threshold period has elapsed since the most recently detected input event, performing the steps of:
initiating a search for suggestions based on content of the plurality of input events; based on results of the search, identifying a plurality of suggestions that are likely queries each of which is selectable by the user;
causing said plurality of suggestions to be displayed at the client.

23. A computer-readable tangible storage medium storing one or more sequences of instructions, which instructions, when executed by one or more processors, cause the one or more processors to carry out the steps of:
tracking a plurality of time intervals between a plurality of keystrokes, each keystroke of said plurality of keystrokes being inputted by a user at a client;
determining a threshold period based on the plurality of time intervals;
wherein said determining a threshold period based on the plurality of time intervals comprises certain steps including:
applying a modified Gaussian distribution to approximate a distribution of time intervals, wherein the distribution of time intervals includes said plurality of time intervals, and wherein the modified Gaussian distribution is derived from an unmodified Gaussian distribution and sets values of any negative time interval value to zero in the unmodified Gaussian distribution; and
determining said threshold period based on said modified Gaussian distribution;
determining whether said threshold period has elapsed since a most recently detected keystroke; and
in response to determining that said threshold period has elapsed since the most recently detected keystroke, causing information to be displayed at the client.

24. The method of claim 1, wherein the search for suggestions is a search performed with a remote server.

25. The method of claim 5, wherein the information to be displayed at the client is requested from a remote server based on said plurality of keystrokes.

* * * * *